United States Patent
Tao et al.

(10) Patent No.: US 9,921,463 B2
(45) Date of Patent: Mar. 20, 2018

(54) VIDEO PROJECTING STRUCTURE, VIDEO PROJECTING METHOD, AND VIDEO PROJECTING WINDOW

(71) Applicant: Asahi Glass Company, Limited, Chiyoda-ku (JP)

(72) Inventors: Yukihiro Tao, Chiyoda-ku (JP); Kenta Sekikawa, Chiyoda-ku (JP); Hitoshi Tsujimura, Chiyoda-ku (JP); Kenichi Ebata, Chiyoda-ku (JP); Yuriko Kaida, Chiyoda-ku (JP)

(73) Assignee: Asahi Glass Company, Limited, Chiyoda-ku (JP)

( * ) Notice: Subject to any disclaimer, the term of this patent is extended or adjusted under 35 U.S.C. 154(b) by 0 days.

(21) Appl. No.: 15/361,111

(22) Filed: Nov. 25, 2016

(65) Prior Publication Data

US 2017/0075207 A1   Mar. 16, 2017

Related U.S. Application Data

(63) Continuation of application No. PCT/JP2015/065583, filed on May 29, 2015.

(30) Foreign Application Priority Data

Jun. 2, 2014 (JP) ................. 2014-113845

(51) Int. Cl.
*G03B 21/60* (2014.01)
*G03B 21/62* (2014.01)
(Continued)

(52) U.S. Cl.
CPC ............... *G03B 21/62* (2013.01); *G02B 5/02* (2013.01); *G02B 5/0242* (2013.01);
(Continued)

(58) Field of Classification Search
CPC .................................................. G03B 21/60
(Continued)

(56) References Cited

U.S. PATENT DOCUMENTS 4,076,398 A * 2/1978 Galbraith ............... G03B 21/00
                                                              353/121
7,495,829 B2 * 2/2009 Peterson ................ G03B 21/60
                                                              359/459
(Continued)

FOREIGN PATENT DOCUMENTS

JP   2001-242546   9/2001
JP   2004-184979   7/2004
(Continued)

OTHER PUBLICATIONS

Written Opinion ISA dated Aug. 18, 2015 PCT/JP2015/065583, filed on May 29, 2015.*

(Continued)

*Primary Examiner* — Clayton E Laballe
*Assistant Examiner* — Kevin Butler
(74) *Attorney, Agent, or Firm* — Oblon, McClelland, Maier & Neustadt, L.L.P.

(57) ABSTRACT

A video projecting structure includes a substrate having a visible light transmittance greater than or equal to 5% and less than or equal to 90%, a front haze greater than or equal to 4 and less than or equal to 40, and a rear haze greater than or equal to 0 and less than or equal to 60. In a case where light is incident on a surface of the substrate at an angle of 45°, an intensity of a backward scattering light is lower than an intensity of a frontward scattering light.

20 Claims, 5 Drawing Sheets

(51) Int. Cl.
*G02B 27/01* (2006.01)
*G09G 3/00* (2006.01)
G03B 21/602 (2014.01)
G02B 5/02 (2006.01)

(52) U.S. Cl.
CPC ......... *G02B 27/0101* (2013.01); *G09G 3/002* (2013.01); *G02B 5/0278* (2013.01); *G02B 2027/0196* (2013.01); *G03B 21/60* (2013.01); *G03B 21/602* (2013.01)

(58) Field of Classification Search
USPC ........................................................ 359/452
See application file for complete search history.

(56) References Cited

U.S. PATENT DOCUMENTS

| | | | | |
|---|---|---|---|---|
| 8,139,290 | B2* | 3/2012 | Choi | G03B 21/56 359/443 |
| 2001/0005282 | A1* | 6/2001 | Etori | G03B 21/62 359/453 |
| 2005/0243078 | A1* | 11/2005 | Ozeki | G02F 1/1334 345/204 |
| 2006/0012876 | A1* | 1/2006 | Choi | G03B 21/625 359/452 |
| 2009/0002817 | A1* | 1/2009 | Harada | G02B 5/0242 359/453 |
| 2015/0153639 | A1* | 6/2015 | Tokunaga | G03B 21/62 359/453 |
| 2017/0075207 | A1* | 3/2017 | Tao | G02B 5/02 |

FOREIGN PATENT DOCUMENTS

| | | | | |
|---|---|---|---|---|
| JP | 2006-133636 | | 5/2006 | |
| JP | 20006-133636 | * | 5/2006 | ............... G02B 5/02 |
| JP | 2010-231080 | | 10/2010 | |
| JP | 2013-182141 | | 9/2013 | |
| JP | 2014-13369 | | 1/2014 | |
| JP | 2014013369 | * | 1/2014 | ............... G02B 5/00 |
| WO | WO 2006/016556 A1 | | 2/2006 | |

OTHER PUBLICATIONS

International Search Report dated Aug. 18, 2015 in PCT/JP2015/065583, filed on May 29, 2015 ( with English Translation).
Written Opinion dated Aug. 18, 2015 in PCT/JP2015/065583, filed on May 29, 2015.

* cited by examiner

VIDEO PROJECTING STRUCTURE, VIDEO PROJECTING METHOD, AND VIDEO PROJECTING WINDOW

CROSS-REFERENCE TO RELATED APPLICATION

This application is a U.S. continuation application filed under 35 USC 111(a) claiming benefit under 35 USC 120 and 365(c) of PCT application PCT/JP2015/065583, filed on May 29, 2015, which claims priority to Application Ser. No. 2014-113845, filed in Japan on Jun. 2, 2014. The foregoing applications are hereby incorporated herein by reference.

TECHNICAL FIELD

The present invention generally relates to a video projecting structure, a video projecting method, and a video projecting window.

BACKGROUND ART

Normally, a screen that visibly displays video light radiated from a projector is aimed to display the video light projected from the projector. Therefore, a viewer cannot view the opposite side (rear side) through the screen. For example, because a conventional transmitting type screen displays a video by transmitting video light projected from the rear side of the screen to the viewer side (front side) of the screen, light from the rear side of the screen can transmit through the screen. Although light can transmit through the transmitting type screen, the viewer may be unable to view the rear side through the screen due to, for example, irregularities provided on the surface of the screen.

Most practically used transmitting type screens employ, for example, a polarization film, a Fresnel lens, or a lenticular lens for attaining high luminance and high contrast. However, such conventional transmitting type screens are costly due to the use of a polarization film or a lens sheet. In addition, viewing the opposite side through the screen is almost impossible for the viewer.

Accordingly, Patent Document 1 discloses a transmitting type screen allowing the rear side to be viewed.

RELATED ART DOCUMENT

Patent Document

Patent Document 1: Japanese Laid-Open Patent Publication No. 2014-13369

However, the transmitting type screen disclosed in Patent Document 1 reduces the visibility of a background that can be seen through a window or the like because the background or an image of an object that are visible through the window or the like may be seen as multiple diffracted images.

Thus, there is a demand for a technology that enables video transmitted through a window or the like to be visible when a projector projects the video on the window or the like and enables a background image transmitted through the window or the like to be visible when the video is not projected by the projector.

SUMMARY OF THE INVENTION

In order to solve the above-described problems, an embodiment of the present invention provides a video projecting structure including a substrate having a visible light transmittance greater than or equal to 5% and less than or equal to 90%, a front haze greater than or equal to 4 and less than or equal to 40, and a rear haze greater than or equal to 0 and less than or equal to 60. In a case where light is incident on a surface of the substrate at an angle of 45°, an intensity of backward scattering light is lower than an intensity of a frontward scattering light.

DESCRIPTION OF EMBODIMENTS

Figure 1:
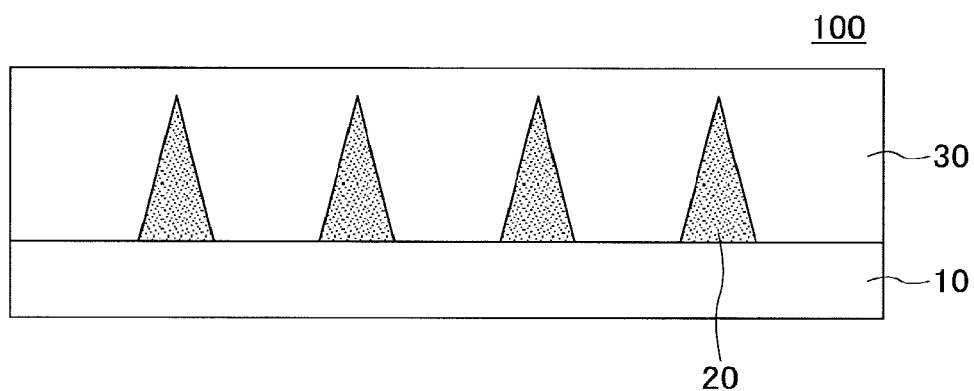
FIG. 1 is a schematic diagram depicting a structure of a video projecting window according to an embodiment of the present invention.

The invention will be described with reference to the accompanying drawings. Throughout the drawings, like components and corresponding configurations are denoted with like reference numerals and further explanation thereof is omitted. The values of transmittance, haze, and backward scattering and frontward scattering described below are measured values in a case where a D65 light source is used in room temperature.

A video projecting structure according to an embodiment of the present invention has a transmittance that is greater than or equal to 5% and less than or equal to 90% relative to visible light. Further, the front haze of the video projecting structure is greater than or equal to 4 and less than or equal to 40 whereas the rear haze of the video projecting structure is greater than or equal to 0 and less than or equal to 60. Further, the intensity of the backward scattering light of the video projecting structure is lower than the intensity of the frontward scattering light of the video projecting structure in a case where light is incident on the video projecting structure at an angle of 45 degrees relative to the surface of the video projecting structure. The front haze refers to the percentage of the transmitted light deviating 2.5 degrees or more from the optical axis of the incident light on the video projecting structure to total transmitted light. The rear haze refers to the percentage of the reflected light that deviates 2.5 degrees or more from the specular reflection light reflected from the video projecting structure to total reflected light.

The transmittance of visible light may be greater than or equal to 20% and less than or equal to 40%. When the transmittance of the visible light is in this range, the visibility of the outside scenery is satisfactory. In order for the screen to maintain a suitable gain, the transmittance of visible light may be greater than or equal to 80%. Because the screen is preferred to have a high gain for functioning as a screen, the screen may have a reflectivity less than or equal to 15% or a reflectivity less than or equal to 10%. Further, the screen may have a reflectivity greater than or equal to 1% or a reflectivity greater than or equal to 5%. Note that the term "reflectivity" refers to total reflectivity.

Alternatively, the front haze of the video projecting structure may be greater than or equal to 5 or greater than or equal to 8. Further, the front haze of the video projecting structure may be less than or equal to 20.

Alternatively, the rear haze of the video projecting structure may be greater than or equal to 5. From the standpoint of transparency, the rear haze of the video projecting structure may be less than or equal to 40 or less than or equal to 20.

In a case where light is incident on the video projecting structure at an angle of 45 degrees relative to the surface of the video projecting structure, the intensity of the light that scatters backward in a direction normal to the video projecting structure may be lower than the intensity of the light that scatters frontward in a direction normal to the video projecting window.

In a case where light is incident on the video projecting structure at an angle of 45 degrees relative to the surface of the video projecting structure, the product $(r \times Hb \times Ib/If)$ of the reflectivity (r), the rear haze (Hb), and the ratio (Ib/If) of "the intensity of the light that scatters backward in a direction normal to the video projecting structure (Ib)" in proportion to "the intensity of the light that scatters frontward in a direction normal to the video projecting structure (If)" may be less than or equal to 500, preferably less than or equal to 250, and more preferably less than or equal to 100 from the standpoint of attaining transparency for viewing a background. The lower limit value is preferably 0. A transparency of the video projecting structure is satisfactory when the product $(r \times Hb \times Ib/If)$ is within the above-described range.

In a case where light is incident on the video projecting structure at an angle of 45 degrees relative to the surface of the video projecting structure, the product $(\log T \times Hf \times Ib/If)$ of the common logarithm of transmittance (logT), the front haze (Hf), and the ratio (Ib/If) of "the intensity of the light that scatters backward in a direction normal to the video projecting structure (Ib)" in proportion to "the intensity of the light that scatters frontward in a direction normal to the video projecting structure (If)" may be greater than or equal to 10, from the standpoint of visibility of an image. The visibility of an image is satisfactory in a bright space when the product is $(\log T \times Hf \times Ib/If)$ within the above-described range.

In a case where optical loss is defined to be "100−transmittance (%)−reflectivity (%)", the product $(T^2 \times loss \times Ib/If)$ of the square of transmittance $(T^2)$, the optical loss (loss), and the ratio (Ib/If) of "the intensity of the light that scatters backward in a direction normal to the video projecting structure (Ib)" in proportion to "the intensity of the light that scatters frontward in a direction normal to the video projecting structure (If)" is preferably greater than or equal to 100,000 from the standpoint of attaining balance between the visibility of an image and the visibility of a background. This is because gain and transmittance become well-balanced. In a case where the product $(T^2 \times loss \times Ib/If)$ of the square of transmittance $(T^2)$, the optical loss (loss), and the ratio (Ib/If) of "the intensity of the light that scatters backward in a direction normal to the video projecting structure (Ib)" in proportion to "the intensity of the light that scatters frontward in a direction normal to the video projecting structure (If)" is greater than or equal to 200,000, the improvement of contrast becomes more significant.

From the standpoint of visibility of the background, the visibility of the background becomes higher as the background contrast becomes larger. The term "background contrast" refers to the ratio between the luminance (Lmax) of a light transmitted through the video projecting structure when the background is white and the luminance (Lmin) of a light transmitted through the video projecting structure when the background is black. The background contrast (Lmax/Lmin) is preferably greater than or equal to 1.9, more preferably greater than or equal to 3.7, and yet more preferably 7.5.

The thickness of the video projecting structure (video projecting window in the below-described embodiment of the present invention) is preferably 2 mm to 30 mm, and more preferably 4 mm to 15 mm.

As one embodiment of the video projecting structure of the present invention, a video projecting window 100 is described below with reference to FIG. 1. The video projecting window 100 of this embodiment includes a transparent layer 30 and multiple stripe-like light scattering parts 20 provided inside the transparent layer 30. The light scattering parts extend in a first dimension direction and arranged substantially parallel to a main surface of the transparent layer 30. A cross section of the light scattering part 20 orthogonal to the extending direction of the light scattering part is preferred to have, for example, a triangular shape, a trapezoidal shape, or a bell shape. The structure in which multiple light scattering parts 20 extend in the first dimension direction in a stripe-like manner may be referred to as a "louver structure". Therefore, the light scattering parts 20 of this embodiment are linearly formed inside the transparent layer 30 and arranged in predetermined intervals. The light scattering parts 20 are preferably arranged at intervals that allow the shape of the transparent layer 30 between adjacent scattering parts 20 to have a vertically long shape relative to the thickness direction of the transparent layer 30. That is, the pitch between adjacent light scattering parts 20 is preferably narrower than the thickness of the transparent layer 30.

The transparent layer 30 of this embodiment preferably has a transmittance of 50% to 100% with respect to visible light. The transparent layer 30 is preferably a transparent resin layer. By setting the transmittance of the transparent layer 30 to be in the above-described range, the video projecting window 100 can easily attain a transmittance greater than or equal to 5% and less than or equal 90%. The transparent resin is preferably a photocurable resin such as acrylic resin, epoxy resin, urethane acrylate, a thermosetting resin, or a thermo-plastic resin. To prevent the function of the video projecting window 100 from degrading and to maintain the transparency of the video projecting window 100, the yellow index of the transparent resin is preferably less than or equal to 10, and more preferably less than or equal to 5.

The thickness of the transparent layer 30 is preferably 10 μm to 200 μm. In a case where the light scattering parts 20 form the louver structure as illustrated in FIG. 1, the pitch between the light scattering parts 20 becomes less than or equal to 10 μm when the thickness of the transparent layer 30 is less than 10 μm and causes difficulty in attaining the effects of the louver structure. From the standpoint of easily controlling the thickness of the transparent layer 30, the transparent layer 30 becomes difficult to fabricate roll-to-roll. When the thickness of the transparent layer 30 is within the above-described range of 10 μm to 200 μm, the intensity of the backward scattering light becomes lower than the intensity of the frontward scattering light in a case where light is incident on the video projecting window 100 at an angle of 45 degrees relative to the surface of the video projecting window 100. Thus, the intensity of the backward scattering light becomes easy to control.

The light scattering part 20 may be formed of, for example, a transparent resin containing a light scattering material or a transparent resin containing both a light scattering material and a light absorbing material. The transparent resin used for the light scattering part 20 may be, for example a photocurable resin such as acrylic resin or epoxy resin, urethane acrylate, a thermosetting resin, or a thermo-plastic resin. The transparent resin used for the light scattering part 20 may be the same or different material of the transparent resin of the transparent layer 30.

The volume ratio between the light scattering part 20 and the transparent layer 30 (light scattering part 20 : transparent layer 30) preferably ranges from 1:1 to 1:10. Setting the volume ratio to the above-described ranges enables the video projecting window 100 to easily attain a transmittance greater than or equal to 5% and less than or equal to 90% with respect to visible light.

The light scattering material used for the light scattering part 20 may be, for example, a material containing fine particles of high-refractive index material such as titanium oxide (refractive index: 2.5 to 2.7), zirconium oxide (refractive index: 2.4), aluminum oxide (refractive index: 1.76), a material containing fine particles of low-refractive index material such as porous silica (refractive index: less than or equal to 1.25), hollow silica (refractive index: less than or equal to 1.25), a resin material being different from the above-described transparent resin and having low compatibility with the above-described transparent resin, or a crystallized resin material containing particles less than or equal to 1 μm. Using the above-described light scattering material enables the video projecting window 100 to easily attain a front haze that is greater than or equal to 4 and less than or equal to 40 and attain a rear haze that is greater than or equal to 0 and less than or equal to 60.

The concentration of the light scattering material contained in the light scattering part 20 is preferably greater than or equal to 0.01 vol % and less than or equal to 5 vol %, and more preferably greater than or equal to 0.05 vol % and less than or equal to 1 vol %. By setting the concentration of the light scattering material in the above-described range, the intensity of the backward scattering light and the intensity of the frontward scattering light can be adjusted.

In a case where the light scattering material includes fine particles, the percentage of light of frontward scattering increases if the center value of the distribution of the size of the fine particles is substantially equal to or slightly smaller than the wavelength of the scattering light. This increases the light scattering material's function of scattering the incident light without refracting the incident light. As a result, distortion of the background image can be prevented because the intensity can be prevented from rapidly changing. Thus, the transparency of the video projecting window 100 can be improved. Note that the center value of the distribution of the size of the fine particles is preferably 1 μm to 0.05 μm, and more preferably 0.8 μm to 0.15 μm. In the case where the light scattering material includes fine particles, the intensity of the scattering light can be adjusted by controlling the size of the fine particles.

For example, carbon black or titanium black may be used as the light absorbing material of the light scattering part 20. The concentration of the light absorbing material contained in the light scattering part 20 is preferably greater than or equal to 0.01 vol % and less than or equal to 10 vol %, and more preferably, greater than or equal to 0.1 vol % and less than or equal to 3 vol %. Further, the optical density (OD) value at the maximum height of the light scattering part 20 is preferably 0.05 to 2, and more preferably, 0.1 to 1. Particularly, in a case where there is external light, the absorbance of the light scattering part 20 is preferably greater than or equal to 5%, and more preferably, greater than or equal to 10%. Because the light scattering part 20 contains a light absorbing material, the light scattering part 20 can absorb a part of the light that propagates as unnecessary stray light inside the video projecting window 100 and reduce the amount of scattered light. Accordingly, a phenomenon of white haze appearing on the video projecting window 100 can be prevented. Further, the visibility can improve owing to the improvement of contrast of the projected image. Thereby, transparency can be improved. Particularly, these effects can easily be obtained in a case where an atmosphere of 100 lux or more created by external light appears in the sight of the viewer. Further, the intensity of the backward scattering light and the intensity of the frontward scattering light can also be adjusted by adjusting the above-described ranges of the amount of light scattering material and light absorbing material contained in the light scattering part 20.

The transparent layer 30 may be layered on a transparent substrate 10. The transparent substrate 10 may be formed of glass or a transparent resin. The transparent substrate 10 is preferably a transparent resin. The glass forming the transparent substrate 10 is preferably soda-lime glass or alkali-free glass. Alternatively, the glass forming the transparent substrate 10 may be, for example, chemically strengthened glass or hard coating glass. The transparent resin forming the transparent substrate 10 may be formed of, for example, photocurable resin such as acrylic resin and epoxy resin, thermosetting resin, or thermo-plastic resin. The transparent resin forming the transparent substrate is preferably the same as the transparent resin forming the transparent layer 30.

The thickness of the transparent substrate is preferably 0.05 mm to 10 mm, and more preferably, 0.1 mm to 5 mm.

In the video projecting structure according to an embodiment of the present invention, the difference between the refractive index of the transparent layer 30 and the refractive index of the light scattering part 20 is preferably less than or equal to 0.01, more preferably, less than or equal to 0.005, and yet more preferably, less than or equal to 0.001. In a case where the difference between the refractive index of the transparent layer 30 and the refractive index of the light scattering part 20 is large, the image seen through the video projecting window 100 may be seen as multiple diffracted images. To prevent iridescent irregularity and diffraction of background, periodic modulation of refractive index and transmittance is to be prevented from occurring. Even if such periodic modulation occurs, the value of the periodic modulation is to be controlled within a permissible range. Thus, the transparent layer 30 and the light scattering part 20 are preferred to have the same refractive index.

The difference between the refractive index of the transparent substrate 10 and the refractive index of the light scattering part 20 is also preferred to be small. The difference between the refractive index of the transparent substrate 10 and the refractive index of the light scattering part 20 is preferably less than or equal to 0.1, more preferably, less than or equal to 0.05, and yet more preferably, less than or equal to 0.001. As described below, irregularities may be periodically formed due to polymerization contraction that occurs when the light scattering part 20 is cured during a process of manufacturing the video projecting structure. Therefore, a material having the same refractive index as the light scattering part 20 may be used as the material of the transparent substrate 10 to bury the irregularities. Because the polymerization contraction is in most cases approximately 10%, the deviation of refractive index between the transparent substrate 10 and the transparent layer 30 is to be controlled to be within approximately 10 times with respect to the difference of refractive index between the transparent substrate 10 and the light scattering part 20.

Figure 2:
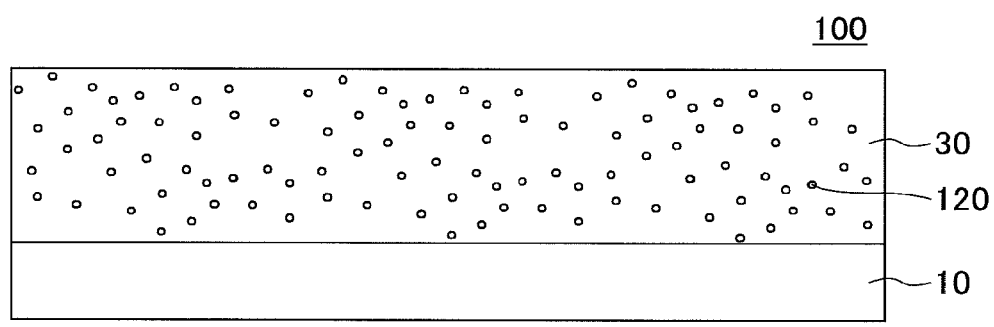
FIG. 2 is a schematic diagram depicting a structure of a video projecting window according to an embodiment of the present invention.

As illustrated in FIG. 2, the video projecting window 100 according to an embodiment of the present invention may be formed to be a light scattering material layer having a flat shape. The light scattering material layer may have fine light scattering particles 120 dispersed inside the transparent layer 30 formed on the transparent substrate 10. The fine light scattering particles 120 may be formed of fine particles of a material having high refractive index such as titanium oxide, zirconium oxide, and aluminum oxide, or fine particles of a material having a low refractive index such as porous silica, and hollow silica. In a case where the center value of the distribution of the size of the fine particles is substantially equal to or slightly smaller than the wavelength of the scattering light, not only the percentage of light scattering frontward increases but also the light scattering material's function of scattering the incident light without refracting the incident light. Thereby, distortion of the background image can be prevented and the intensity can be prevented from rapidly changing. Thus, the transparency of the video projecting window 100 can be improved. The average particle diameter of the fine light scattering particles 120 is preferably greater than or equal to 25 nm and less than or equal to 1000 nm, more preferably, greater than or equal to 50 nm and less than or equal to 1000 nm, and yet more preferably, greater than or equal to 100 nm and less than or equal to 800 nm. By controlling the average particle diameter of the fine light scattering particles 120 to the above-described range, the intensity of the backward scattering light can be adjusted to be lower than the intensity of the frontward scattering light. Note that the flat-shaped scattering material layer may be formed of a light scattering material that does not contain fine light scattering particles. In a case where the light scattering layer does not contain fine light scattering particles, the intensity of the backward scattering light can be adjusted to be lower than the intensity of the frontward scattering light by placing two materials of different refractive indices in contact with each other at the irregular interface between the two materials.

Because the video projecting window 100 is for enabling the background to be viewed, it is a premise that external light exists in the surroundings when using the video projecting window 100. Therefore, in a case where external light incident to a video projecting window causes light to propagate, scatter, and radiate from the video projecting window, the contrast of the image and background projected by the video projecting window is degraded by the propagating and scattering light. Therefore, a light absorbing material is provided inside the flat-shaped light scattering material layer and the transparent layer 30 as illustrated in the structure of FIG. 2, so that the phenomenon of degradation of contrast of the image or background due to external light radiated from undesired parts of the video projecting window can be prevented, and a satisfactory visibility can be maintained. Materials such as carbon black or titanium black may be used as the light absorbing material. The density of the light absorbing material contained in the flat-shaped light scattering material layer or the transparent layer 30 is preferably greater than or equal to 0.01 vol % and less than or equal to 5 vol %, and more preferably, greater than or equal to 0.1 vol % and less than or equal to 3 vol %. The amount of light absorbance is preferably greater than or equal to 0.5 with respect to orthogonally incident light, more preferably greater than or equal to 5% with respect to orthogonally incident light, and yet more preferably, greater than or equal to 10% with respect to orthogonally incident light. Further, because the amount of light of the projected image can be appropriate when the amount of light absorbance is less than or equal to 90% with respect to orthogonally incident light, the amount of light absorbance is preferably less than or equal to 75% with respect to orthogonally incident light, and more preferably, less than or equal to 50% with respect to orthogonally incident light.

The video projecting window 100 according to an embodiment of the present invention may have the following configuration formed on the transparent substrate 10. The configuration may be a volume hologram that transmits, deflects, and diffuses light. Alternatively, the configuration may be a Kinoform hologram or a configuration having a roughness surface that transmits, deflects, and diffuses light.

Figure 3:
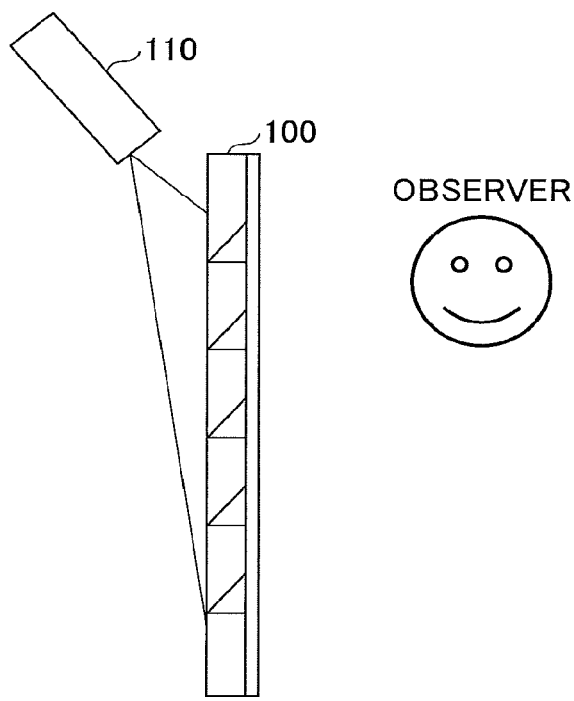
FIG. 3 is a schematic diagram for illustrating a video projecting window according to an embodiment of the present invention.

Note in FIG. 3 that the video projecting window 100 according to an embodiment of the present invention is a transparent type video projecting window. That is, the video projecting window 100 is for enabling video to be viewed through the video projecting window 100 by a viewer on the opposite side of the projector 100 by projecting the video to the video projecting window 100 from the projector 110.

Next, a method for manufacturing a video projecting window 100 according to an embodiment of the present invention is described. More specifically, a method for manufacturing one type of video projecting window 100 having a structure illustrated in FIG. 4 is described.

Figure 4:
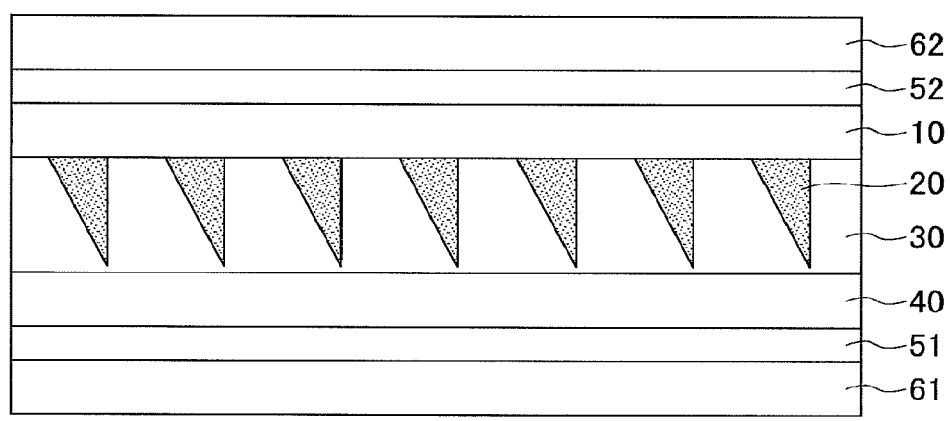
FIG. 4 is a schematic diagram depicting a video projecting window according to an embodiment of the present invention.

The video projecting window 100 of FIG. 4 has a laminated glass structure. The laminated structure includes a transparent resin film 40 laminated on the transparent layer 30 of the video projecting window 100 of FIG. 1, a first glass substrate 61 laminated on the transparent resin film 40 by way of an adhesive layer 51, and a second glass substrate 62 laminated on the transparent substrate 10 by way of an adhesive layer 52.

The method for producing the video projecting window 100 illustrated in FIG. 4 is described with reference to FIGS. 5A to 5C and FIG. 6.

Figure 5A:
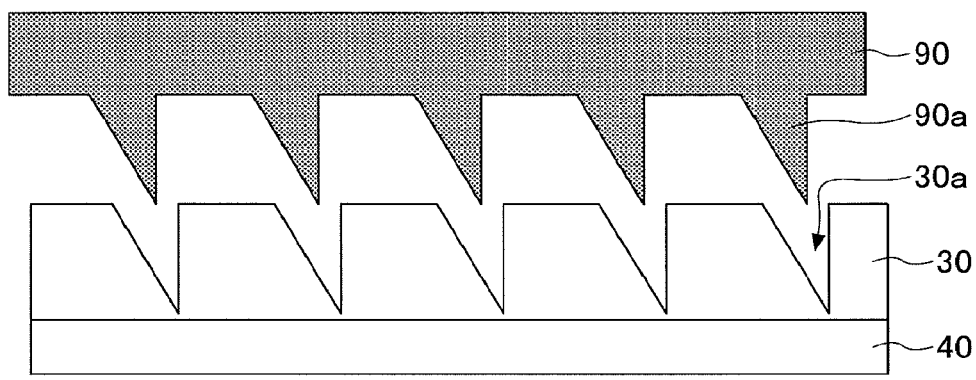
FIGS. 5A-5C are schematic diagrams depicting a method for manufacturing a video projecting window according to an embodiment of the present invention.

First, the transparent layer 30 is formed on the transparent resin film 40 as illustrated in FIG. 5A. More specifically, a photocurable resin is applied on a surface of the transparent film 40 by using, for example, a spin-coating method, a die-coating method, an inkjet coating method, or a spray-coating method. Then, the photocurable resin is cured by pressing a mold 90 against the coated photocurable resin and radiating ultraviolet light to the photocurable resin. Thereby, the transparent layer 30 corresponding to the transparent resin layer is formed. Then, the mold 90 is peeled from the transparent layer 30. Accordingly, the transparent layer 30 including a surface on which a groove 30a corresponding to the shape of the light scattering part 20 is formed. Note that the mold 90 may be formed with a resin mold including a protruding part 90a having a shape corresponding to the light scattering part 20 formed in a subsequent process. In this case, the surface of the mold 90 provided with the protruding part 90a is positioned above the coated photocurable resin and pressed against the photocurable resin, so that the groove 30a corresponding to the shape of the protruding part 90a is formed on the surface of the transparent layer 30. Note that the transparent layer 30 may be formed with a thermosetting resin.

Thereby, the light scattering part 20 having a louver structure is formed on the surface of the transparent layer 30.

The pitch of the grooves 30a is preferred to be small such that the pitch is hardly visible. The pitch of the grooves 30a is preferably less than or equal to 250 μm, and more preferably less than or equal to 100 μm. Further, from the standpoint of facilitating the fabrication of the groove 30a, the groove 30a can be easily fabricated if the groove 30a is relatively large. More specifically, the groove 30a is preferably greater than or equal to 10 μm. The groove 30a is preferred to be narrow from the standpoint of improving transmittance and visibility of the background. The width of the groove 30a is preferably less than or equal to 70% with respect to the pitch of the grooves 30a, and more preferably, less than or equal to 50% with respect to the pitch of the grooves 30a. From the standpoint of facilitating the fabrication of the groove 30a, the width of the groove 30a is greater than or equal to 10% with respect to the pitch of the grooves 30a, and more preferably, greater than or equal to 25% with respect to the pitch of the grooves 30a. Regarding the depth of the groove 30a, the aspect ratio is preferred to be high with respect to the width of the groove 30a. The aspect ratio of the depth of the groove 30a with respect to the width of the groove 30a is preferably greater than or equal to 1, more preferably, greater than or equal to 1.5, and yet more preferably, greater than or equal to 2. From the standpoint of facilitating the fabrication of the groove 30a and attaining low manufacturing cost, the length of the groove 30a is preferably elongated substantially to the same extent as the transparent film 40 in the groove direction. Further, it is preferred to form the groove 30 with a pillar structure in which the width of the groove 30a and the length of the groove 30a are substantially the same because dependency on the projection angle can be reduced even in a case where the projector 110 that projects an image to a screen is positioned near the screen.

Figure 5B:
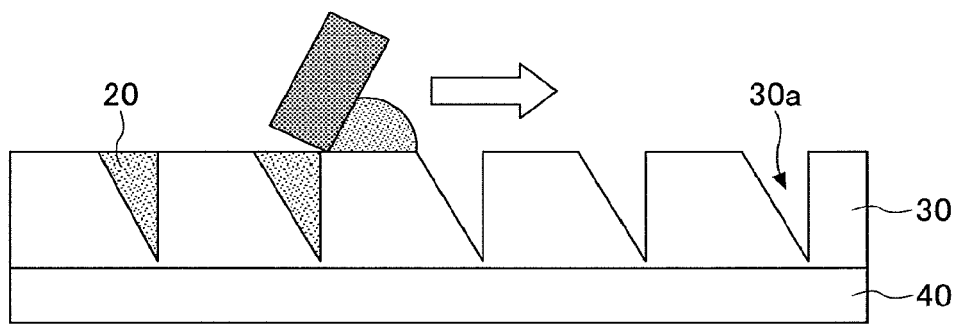

Next, the light scattering part is formed in the groove 30a of the transparent layer 30 as illustrated in FIG. 5B. For example, a paste containing a photocuring resin for forming the light scattering part 20 is supplied into the groove 30a of the transparent layer 30, and excess paste on the transparent layer 30 is removed with a doctor blade. Thereby, the paste is buried into the groove 30a of the transparent layer 30. Then, the light scattering part 20 is formed in the groove 30a of the transparent layer 30 by radiating ultraviolet light and curing the paste. Accordingly, the light scattering part 20 having the louver structure can be formed. Note that the light scattering part 20 may also be formed by using a thermosetting resin.

In this embodiment, the paste used for forming the light scattering part 20 is mixed with the photocurable resin used when forming the transparent layer 30, so that the light diffusing material having a desired density can be obtained.

Figure 5C:
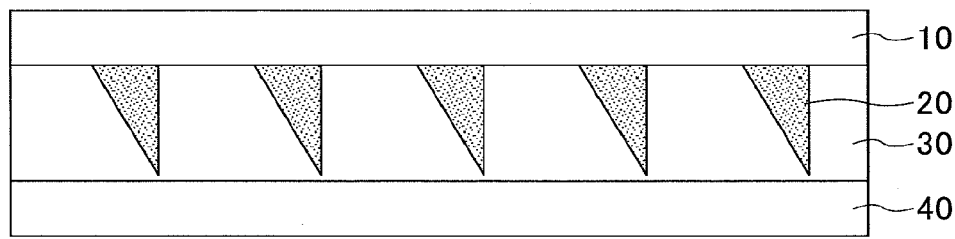

Then, a photocurable resin for forming the transparent substrate 10 is applied onto the transparent layer 30 and the light scattering part 20 as illustrated in FIG. 5C. Thereby, the surface of the transparent layer 30 can be flattened in a case where irregularities are formed during the forming of the light scattering part 20. More specifically, after the photocurable resin used for forming the transparent layer 30 is applied onto the transparent layer 30 and the light scattering part 20, a transparent substrate (not illustrated) is placed on the applied photocurable resin, and an ultraviolet light is radiated to the transparent substrate (not illustrated). Then, the transparent substrate (not illustrated) is peeled from the applied photocurable resin. Thereby, the transparent substrate 10 is formed on the transparent layer 30 and the light scattering part 20. Note that the transparent substrate 10 is preferred to be formed with the same material as the material used for forming the transparent layer 30.

Figure 6:
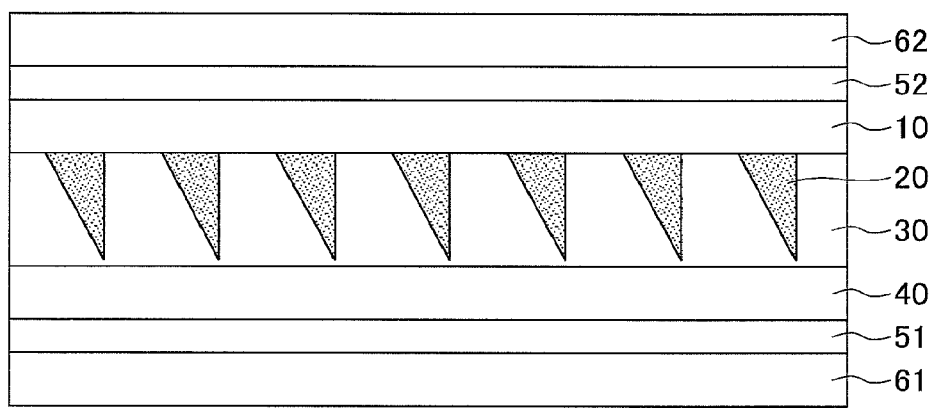
FIG. 6 is a schematic diagram depicting a method for manufacturing a video projecting window according to an embodiment of the present invention.

Then, as illustrated in FIG. 6, the video projecting window 100 having a laminated glass structure is formed. More specifically, a first glass substrate 61, a second glass substrate 62, and PVB (Poly Vinyl Butyral) films serving to be the adhesive layers 51, 52 are prepared. Then, the PVB film serving to be the adhesive layer 51 and the first glass substrate 61 are sequentially layered on the transparent resin film 40, and the PVB film serving to be the adhesive layer 52 and the second glass substrate 62 are layered on the transparent substrate 10. Then, by performing a vacuum thermocompression bonding process on the layered structure having the first glass substrate 61, the second glass substrate 62, and the adhesive layers 51, 52 layered on the transparent layer 30, a laminated glass structure having a light scattering louver illustrated in FIGS. 5A-5C is formed. Thereby, the fabrication of the video projecting window 100 is completed.

Note that the adhesive layers 51, 52 are for adhering the first glass substrate 61 and the second glass substrate 62. The adhesive layers 51, 52 may be, for example, a thermosplastic resin compound having a thermo-plastic resin as its main component. The thicknesses of the adhesive layers 51, 52 are not limited in particular. For example, the thickness of each of the adhesive layers 51, 52 is preferably 0.025 mm to 1.0 mm, and more preferably 0.05 mm to 0.5 mm.

A conventional thermo-plastic resin used for an adhering purpose may be used as the thermos-plastic resin of the adhesive layers 51, 52. For example, a plasticized polyvinyl acetal resin, a plasticized polyvinyl chloride resin, a saturated polyester resin, a plasticized saturated polyester resin, a polyurethane resin, a plasticized polyurethane resin, an ethylene-vinyl acetate copolymer resin, or an ethylene-ethyl acrylate copolymer resin may be used as the thermos-plastic resin of the adhesive layers 51, 52.

The configuration including the transparent layer 30 illustrated in FIG. 2 can be obtained by preparing a paste containing the fine light scattering particles and a photocurable resin with the above-described method of forming the paste for forming the light scattering part 20, applying the paste by using a doctor blade, radiating an ultraviolet light to the paste, and curing the paste.

Next, the usages of the video projecting structure according to an embodiment of the present invention are described.

Displaying an image for the interior of a living space, for a commercial, or for an educational purpose Displaying an advertisement by projecting an image from the inside of a building Displaying information, an advertisement or the like at a car dealer Displaying an advertisement, a movie on a triangular small window or a fixed sash window of a building or changing the exterior design of the building (particularly, an upper part of a window)

Displaying advertisements, information, events by using a glass door of a supermarket, a retail store, or a public building Displaying growth information or the like as a construction material of a greenhouse or the like Displaying an image as a glass wall capable of changing a pattern of wallpaper Displaying an image as a backboard of a stadium or a studio Displaying an image as a partition of a bathroom of a hotel or the like Displaying a suitable video and projecting light or not light to serve as a switchable privacy screen. Particularly, security can be improved when guarding in a conference room, a hospital, a bank, a restaurant, or a public facility in a case where the privacy screen is not used because the other side can be clearly seen when no light is being projected.

Displaying a character, a sign, an image, a video at an airport, a train station, a hospital, or a school Displaying local information or sightseeing information at a religious facility such as a temple, a shrine, or a church Producing a space in a commercial facility Projection mapping Displaying a character, a sign, an image, or a video at a stadium Projecting information and personal videos at a kitchen Using as a whiteboard as a writable and displayable tool for a school or a meeting Further, it can also serve as a user interface.

Using as a pair glass for a heat insulation glass to serve as a refrigerator door in a supermarket or a convenience store The following are usages of the video projecting structure when the video projecting structure is used as, for example, a table-top or a casing Using as a table-top in a restaurant Using as a counter of a sushi restaurant Using as a desk (desktop) or a kitchen counter Using as a table-top partition Using as a showcase in a basement floor of a department store Using as a showcase or a dressing room of boutique shop Using as a vending machine Using as a partition in a pachinko parlor or a front glass of a pachinko machine. Displaying a store's advertisement on a front glass of the pachinko machine when the pachinko machine is unoccupied The following are usages of the video projecting structure when the video projecting structure is used in a vehicle Use in a Railway Train Using as a window glass at a rear side of a driver (prevention of reflection of lighting inside vehicle when running underground)

Displaying information on a side glass of a railway train

Displaying on a hanging advertisement inside a railway train

Using as a part of a partition inside a bullet train

Using as a window glass of a linear motor car

Adding a screen function to a window of a railway train Particularly, suitable for use after sundown or the like because visibility increases after sundown Use in an Automobile or the Like Displaying information in a shade part of a front glass an automobile Displaying information in a lower part of front glass of an automobile Displaying information in a partition inside a taxi or a limousine, displaying an advertisement inside a video displaying bus (Behind driver)

Using as a sun visor of an automobile

Displaying a video of television or a DVD as a partition inside minivan or an SUV Using as a warning sign or the like on a door glass when opening a door on the side of an automobile Installing to a rear glass of an automobile, displaying information to a rear side with a backlight or HMSL (High Mount Stop Light), and displaying a destination of a bus or the like Using in a surrounding of a meter Using as a screen for a door glass Further, the video projecting structure may use a function of diffusing reflected light or transmitted light such as an anti-glare glass or an anti-glare mirror. Further, the video projecting structure may be used as a head-up display of an automobile and an screen for projecting a video.

Further, the video projecting structure may also be used to enhance design by being used on a floor or the steps of stairs or the like or display a warning such as "watch your step".

Further, the video projecting structure may also be used for a special purpose such as a cover glass of a traffic light (combination of a display of various signals).

PRACTICAL EXAMPLES

Although practical examples of the present invention are described below, the present invention is not limited to the below-described practical examples.

Practical Example 1

A transparent polyethylene terephthalate (PET) film (refractive index: 1.58) having a thickness of 50 µm was used as the transparent resin film 40. Note that the refractive index is a value measured at room temperature by using a D-line (wavelength: 589 nm) of a sodium vapor lamp. As for the ultraviolet curing resin, Hitaloid (trademark) 7981 (Hitachi Chemical Company Ltd., specific gravity: 1.1) was used. The ultraviolet curing resin was applied to the surface of the transparent resin film 40 by using a spin-coating method.

A mold 90 having multiple protruding parts 90a aligned on a flat surface in a stripe-like manner was prepared. The mold 90 was pressed onto the coated ultraviolet curing resin with a gauge pressure of 0.5 MPa under a temperature of 25° C. By radiating the ultraviolet light, the ultraviolet curing resin was cured. Thereby, the transparent layer 30 was formed. After forming the transparent layer 30, the mold 90 was peeled from the transparent layer 30.

Thereby, grooves 30a having triangular cross sections were formed on a 100 mm×100 mm of the surface of the transparent resin 30 in which the pitch of the grooves 30a was 80 µm, the width of the groove 30a was 40µ, the depth of the groove 30a was 80 µm, and the length of the groove 30a was 100 µm. Accordingly, the grooves 30a for forming the light scattering part 20 having the louver structure were formed.

A mixed paste was prepared as the paste for forming the light scattering part 20 by mixing the ultraviolet curing resin used for forming the transparent layer 30 with fine titanium oxide particles (average particle diameter: 0.2 µm, specific gravity: 4.2) serving as the light scattering material, so that the concentration of the light scattering material contained in the mixed paste becomes 0.1 vol %. The mixed paste was supplied into the grooves 30a of the transparent layer 30 and excess mixed paste was removed by using a doctor blade. Then, the mixed paste was cured by radiating ultraviolet light to the mixed paste. Thereby, the light scattering parts 20 were formed in the grooves 30*a* of the transparent film 30.

After applying the ultraviolet curing resin onto the transparent layer 30 and the light scattering parts 20 and placing a transparent substrate on the ultraviolet curing resin, ultraviolet light was radiated to the transparent substrate. Then, the transparent substrate was peeled from the transparent layer 30. Thereby, an video projecting structure having the transparent layer 30 and the light scattering parts 20 formed on the transparent substrate 10 was fabricated.

Practical Example 2

A video projecting structure having the same configuration as the configuration illustrated in FIG. 2 was fabricated. A flat-shaped light scattering material layer having the transparent layer 30 mixed with fine light scattering particles 120 was formed. The flat-shaped light scattering material layer was formed by applying the same material for forming the light scattering part 20 of practical example 1 onto the transparent substrate 10. The thickness of the material applied onto the transparent substrate 10 was 20 μm.

Practical Example 3

A video projecting structure was fabricated by using the same method used in practical example 1. It is, however, to be noted that the light scattering part 20 in practical example 3 contains 1 vol % of carbon black.

Practical Example 4

A video projecting structure was fabricated by using the same method used in practical example 1. It is, however, to be noted that the light scattering part 20 in practical example 4 contains 5 vol % of carbon black.

Practical Example 5

A video projecting structure was fabricated by using the same method used in practical example 2. It is, however, to be noted that the flat-shaped light scattering material layer was formed by applying the same material for forming the light scattering part 20 of practical example 4 onto the transparent substrate 10. The thickness of the material applied onto the transparent substrate 10 was 20 μm.

Practical Examples 6, 7

In practical examples 6 and 7, the density and thickness of the fine light scattering materials were increased in comparison with practical example 2. The front haze measured in practical example 6 was 23.56, and the front haze measured in practical example 7 was 30.2.

Comparative Example 1

A soda-lime glass substrate having a thickness of 3 mm was prepared.

Comparative Example 2

The configuration of comparative example 2 is similar to the configuration of practical example 1. It is, however, to be noted that the type and density of fine light scattering particles contained in the light scattering part 20 of comparative example 2 was adjusted to increase rear haze.

Comparative Example 3

The configuration of comparative example 3 is similar to the configuration of practical example 2. It is, however, to be noted that the type and density of fine light scattering particles contained in the light scattering part 20 of comparative example 3 was adjusted, so that the haze becomes 85.0.

Optical characteristics indicated in Table 1 were measured and evaluated for each of the video projecting structures of the above-described practical examples and the comparative examples. Results of the measurement and evaluation are indicated in Table 1 and Table 2.

TABLE 1

|  | TRANSMITTANCE | REFLECTIVITY | FRONT HAZE | REAR HAZE | BACKWARD SCATTERING WHEN LIGHT IS INCIDENT AT 45°/ FRONTWARD SCATTERING WHEN LIGHT IS INCIDENT AT 45° | REFLECTIVITY × REAR HAZE × BACKWARD SCATTERING WHEN LIGHT IS INCIDENT AT 45°/FRONTWARD SCATTERING WHEN LIGHT IS INCIDENT AT 45° |
|---|---|---|---|---|---|---|
| COMPARATIVE EXAMPLE 1 | 90.67 | 9.33 | 0.1 | 3.0 | 1.0 | 28.0 |
| PRACTICAL EXAMPLE 1 | 84.7 | 9.18 | 15.9 | 42.8 | 0.4 | 152.5 |
| PRACTICAL EXAMPLE 2 | 79.8 | 8.92 | 15.2 | 30.8 | 0.2 | 60.0 |
| PRACTICAL EXAMPLE 3 | 63.7 | 6.9 | 9.6 | 24.5 | 0.3 | 55.8 |
| PRACTICAL EXAMPLE 4 | 47.7 | 6.41 | 6.4 | 17.6 | 0.7 | 77.1 |
| PRACTICAL EXAMPLE 5 | 47.7 | 6.42 | 9.9 | 24.6 | 0.7 | 112.5 |
| PRACTICAL EXAMPLE 6 | 71.8 | 8.95 | 23.6 | 34.2 | 0.4 | 120.9 |
| PRACTICAL EXAMPLE 7 | 87.7 | 11.61 | 30.2 | 48.6 | 0.4 | 203.9 |
| COMPARATIVE EXAMPLE 2 | 69.9 | 16.93 | 15.5 | 64.2 | 0.8 | 844.8 |

TABLE 1-continued

| | | | | | | |
|---|---|---|---|---|---|---|
| COMPARATIVE EXAMPLE 3 | 80.9 | 13.4 | 85.0 | 94.2 | 0.5 | 577.5 |

| | Log (TRANSMITTANCE) × HAZE × BACKWARD SCATTERING WHEN LIGHT IS INCIDENT AT 45°/FRONTWARD SCATTERING WHEN LIGHT IS INCIDENT AT 45° | TRANSMITTANCE × TRANSMITTANCE × OPTICAL LOSS × BACKWARD SCATTERING WHEN LIGHT IS INCIDENT AT 45°/FRONTWARD SCATTERING WHEN LIGHT IS INCIDENT AT 45° | BACK- GROUND VISIBILITY | IMAGE VISIBILITY |
|---|---|---|---|---|
| COMPARATIVE EXAMPLE 1 | 0.2 | 0.0 | 0 | 3 |
| PRACTICAL EXAMPLE 1 | 79.0 | 113167.0 | 1 | 2 |
| PRACTICAL EXAMPLE 2 | 132.4 | 328985.3 | 1 | 2 |
| PRACTICAL EXAMPLE 3 | 52.5 | 361365.0 | 0 | 1 |
| PRACTICAL EXAMPLE 4 | 15.7 | 152992.2 | 0 | 1 |
| PRACTICAL EXAMPLE 5 | 23.3 | 146574.0 | 1 | 2 |
| PRACTICAL EXAMPLE 6 | 110.8 | 251113.6 | 2 | 1 |
| PRACTICAL EXAMPLE 7 | 162.3 | 14681.9 | 2 | 1 |
| COMPARATIVE EXAMPLE 2 | 36.8 | 82801.9 | 2 | 0 |
| COMPARATIVE EXAMPLE 3 | 354.2 | 82032.9 | 3 | 1 |

BACKGROUND VISIBILITY 0: SATISFACTORY AT FAR DISTANCE 1: SATISFACTORY AT NEAR DISTANCE 2: BACKGROUND RECOGNIZABLE LEVEL 3: NOT VISIBLE
IMAGE VISIBILITY 0: SATISFACTORY 1: SATISFACTORY WHEN SURROUNDING IS DARK 2: GENERALLY RECOGNIZABLE LEVEL 3: NOT VISIBLE

TABLE 2

| | LUMINANCE IN WHITE BACKGROUND | LUMINANCE IN BLACK BACKGROUND | BACKGROUND CONTRAST |
|---|---|---|---|
| BACKGROUND | 4.37 | 0.03 | 145.67 |
| COMPARATIVE EXAMPLE 1 | 3.89 | 0.05 | 77.8 |
| PRACTICAL EXAMPLE 1 | 3.94 | 0.95 | 4.15 |
| PRACTICAL EXAMPLE 2 | 3.85 | 0.9 | 4.28 |
| PRACTICAL EXAMPLE 3 | 3.06 | 0.22 | 13.91 |
| PRACTICAL EXAMPLE 5 | 2.85 | 0.55 | 5.18 |
| PRACTICAL EXAMPLE 6 | 3.94 | 1.13 | 3.49 |
| PRACTICAL EXAMPLE 7 | 3.65 | 1.11 | 3.29 |
| COMPARATIVE EXAMPLE 3 | 3.35 | 3.11 | 1.08 |

Figure 7A:
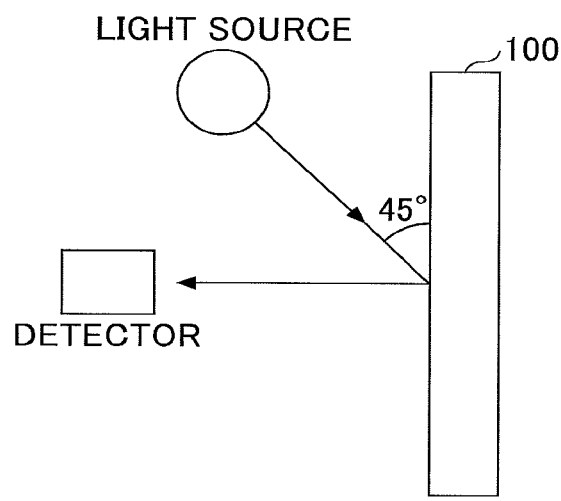
FIGS. 7A and 7B are schematic diagrams for illustrating a method for measuring frontward scattering and backward scattering when light is incident on the video projection structure at an angle of 45 degrees
Figure 7B:
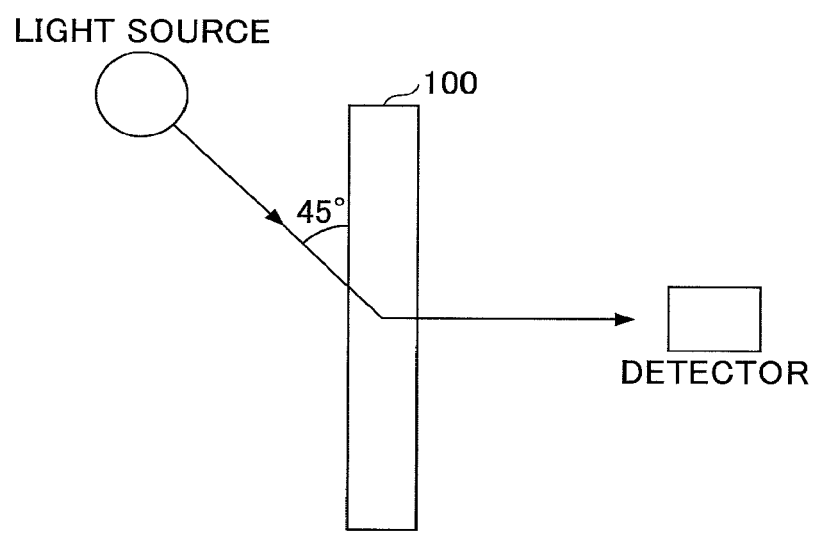

Note that the term "front haze" of Table 1 indicates the percentage of the transmitted light deviating at an angle greater than or equal to 2.5 degrees from the optical axis of the incident light among the transmitted light. The term "rear haze" of Table 1 indicates the percentage of the reflected light deviating at an angle greater than equal to 2.5 degrees from the specular reflection among the reflected light. The term "backward scattering when light is incident at 45°/frontward scattering when light is incident at 45°" of Table 1 indicates the ratio between frontward scattering light and backward scattering light in a case where light is incident on the surface of the video projecting window 100 at an angle of 45 degrees. More specifically, the term "backward scattering when light is incident at 45°" indicates scattering light that scatters backward in a tangential direction of the video projecting window 100 when light is incident on the surface of the video projecting window 100 at an angle of 45 degrees as illustrated in FIG. 7A. The term "front scattering when light is incident at 45°" indicates scattering light that scatters frontward in a tangential direction of the video projecting window 100 when light is incident on the surface of the video projecting window 100 at an angle of 45 degrees as illustrated in FIG. 7B. The haze was measured by using a haze-meter (manufactured by Suga Test Instruments Co., Ltd., Type No. HGM-3K).

The term "background visibility" refers to the visibility of the background or the like that can be seen through the video projecting window 100. "0" indicates an evaluation "satisfactory at far distance", "1" indicates an evaluation "satisfactory at close distance" "2" indicates an evaluation "background recognizable level", and "3" indicates an evaluation "not visible".

The "background contrast" was obtained by the following method. A luminance meter, a white screen, a black screen, and a video projecting window were prepared. The luminance meter and the white screen are positioned at an interval of approximately 1 m. The video projecting window was interposed between the luminance meter and the white screen and positioned to be parallel to the white screen. Intensities were adjusted, so that the intensity at a given position between the luminance meter and the white screen was 220 lux in the direction parallel to the video projecting window, and the intensity at the given position between the luminance meter and the white screen was 130 lux in the direction orthogonal to the video projecting window. Then, the white screen was changed to the black screen, and luminance was measured in a similar manner with the luminance meter. A black felt was used as the black screen. Further, the surrounding of the black felt was covered by a hood for preventing ambient light from entering the black felt. The luminance during the use of the white screen was eliminated with the luminance during the use the black screen. Thereby, background contrast was attained.

According to the above-described embodiments of the present invention, the background contrast is high and visibility is satisfactory.

The term "image visibility" refers to the visibility of an image that can be seen through the video projecting window when the image is projected to the video projecting window. "0" indicates an evaluation "satisfactory", "1" indicates an evaluation "satisfactory when surrounding is dark", "2" indicates an evaluation "generally recognizable level", and "3" indicates an evaluation "not visible".

With the video projecting structure according to the above-described embodiment of the present invention, a background image seen through the video projecting structure can be highly visible and a projected video can be viewed with high visibility.

Although embodiments of a video projection structure, a video projection method, and a video projection window have been described above, the present invention are not limited to the above-described embodiments. Variations and modifications may be made without departing from the scope of the present invention.

The invention claimed is:

1. An image projecting structure comprising:
a substrate having a visible light transmittance greater than or equal to 5% and less than or equal to 90%, a front haze greater than or equal to 4 and less than or equal to 40, and a rear haze greater than or equal to 0 and less than or equal to 60;
wherein in a case where light is incident on a surface of the substrate at an angle of 45°, an intensity of backward scattering light is lower than an intensity of frontward scattering light, and
wherein a product of a reflectivity of the substrate (%), the rear haze, and a ratio of the intensity of the backward scattering light in a direction normal to the image projecting structure to the intensity of the frontward scattering light in the direction normal to the image projecting structure in a case where light is incident on a surface of the substrate at an angle of 45°, is less than or equal to 500.

2. The image projecting structure as claimed in claim 1, wherein a product of a common logarithm of the visible light transmittance of the substrate (%), the front haze, and a ratio of the intensity of the backward scattering light in the direction normal to the image projecting structure to the intensity of the frontward scattering light in the direction normal to the image projecting structure in a case where light is incident on a surface of the substrate at an angle of 45°, is greater than or equal to 10.

3. The image projecting structure as claimed in claim 1, wherein a product of a square of the visible light transmittance (%), an optical loss, and a ratio of the intensity of the backward scattering light in the direction normal to the image projecting structure to the intensity of the frontward scattering light in the direction normal to the image projecting structure in a case where light is incident on a surface of the substrate at an angle of 45°, is greater than or equal to 100,000,
wherein the optical loss is defined to be:

100−transmittance (%)−reflectivity (%).

4. The image projecting structure as claimed in claim 3, wherein the product of a square of the visible light transmittance (%), the optical loss, and the ratio of the intensity of the backward scattering light in the direction normal to the image projecting structure to the intensity of the frontward scattering light in the direction normal to the image projecting structure in a case where light is incident on a surface of the substrate at an angle of 45°, is greater than or equal to 200,000.

5. The image projecting structure as claimed in claim 1, wherein the substrate comprises a transparent layer; and a plurality of light scattering parts that are linearly formed inside the transparent layer, and
wherein the plurality of light scattering parts are arranged at predetermined intervals.

6. The image projecting structure as claimed in claim 5, wherein the plurality of light scattering parts comprises a light scattering material, and
wherein the light scattering material are fine particles.

7. The image projecting structure as claimed in claim 6, wherein the plurality of light scattering parts further comprises a light absorbing material.

8. The image projecting structure as claimed in claim 5, wherein a volume ratio of the light scattering part to the transparent layer ranges from 1:1 to 1:10.

9. The image projecting structure as claimed in claim 5, wherein a difference between a refractive index of the transparent layer and a refractive index of the light scattering part is less than or equal to 0.01.

10. The image projecting structure as claimed in claim 5, wherein a difference between a refractive index of the transparent layer and a refractive index of the light scattering part is less than or equal to 0.001.

11. The image projecting structure as claimed in claim 1, wherein the substrate is provided inside an automobile.

12. An image projecting window comprising:
the image projecting structure as claimed in claim 1.

13. The image projecting structure as claimed in claim 1, wherein the image projecting structure comprises:
a transparent substrate; and
a light scattering material layer provided on the transparent substrate, the light scattering material layer having a flat shape and comprising a transparent layer and fine light scattering particles dispersed in the transparent layer.

14. The image projecting structure as claimed in claim 13, wherein at least one of the transparent layer and the light scattering material layer comprises a light absorbing material.

15. The image projecting structure as claimed in claim 1, wherein the image projecting structure has a laminated glass structure.

16. The image projecting structure as claimed in claim 1, wherein the substrate has the visible light transmittance in a range from 40 to 80%, the front haze in a range of from 8 to 20, and the rear haze in a range from 5 to 20.

17. The image projecting structure as claimed in claim 1, wherein the product of the reflectivity of the substrate (%), the rear haze, and the ratio of the intensity of the backward scattering light in the direction normal to the image projecting structure to the intensity of the frontward scattering light in the direction normal to the image projecting structure in a case where light is incident on a surface of the substrate at an angle of 45°, is less than or equal to 250.

18. The image projecting structure as claimed in claim 1, wherein the product of the reflectivity of the substrate (%), the rear haze, and the ratio of the intensity of the backward scattering light in the direction normal to the image projecting structure to the intensity of the frontward scattering light in the direction normal to the image projecting structure in a case where light is incident on a surface of the substrate at an angle of 45°, is less than or equal to 100.

19. A method for projecting an image, the method comprising:
projecting an image from a projector to the image projecting structure of claim 1,
wherein the image transmitted through the image projecting structure is visible.

20. The method as claimed in claim 19, wherein an area on a side of viewing the image transmitted through the image projecting structure is brighter than an area on a side on which the projector is positioned.

* * * * *